Oct. 22, 1968  P. J. MANETTA ET AL  3,406,836
TRANSFER DEVICE
Filed Sept. 9, 1966  3 Sheets-Sheet 3
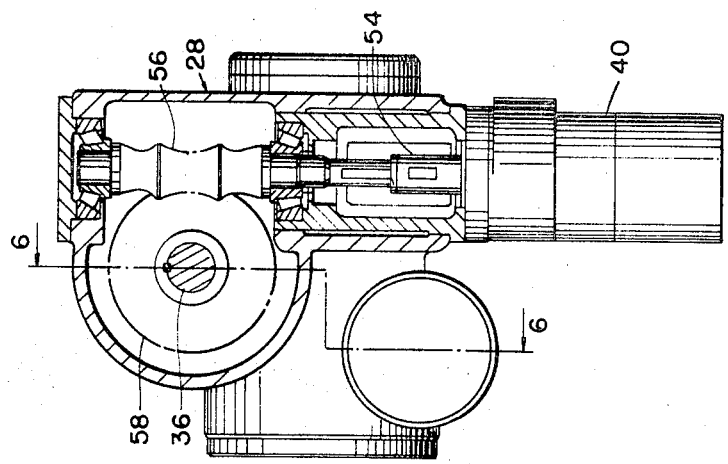
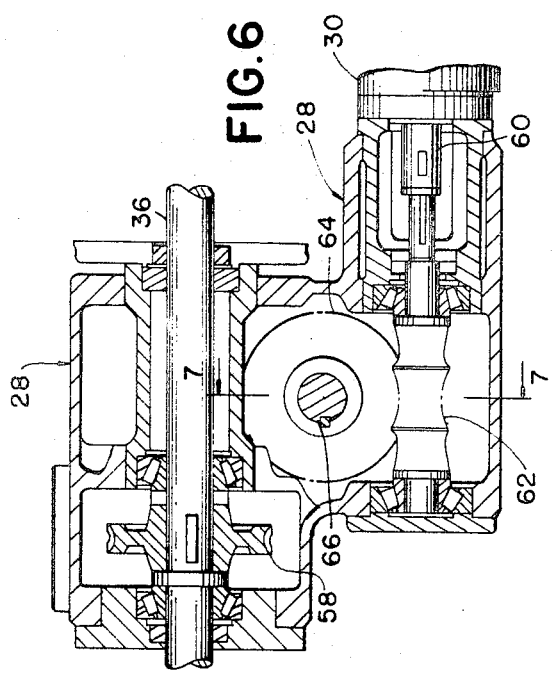
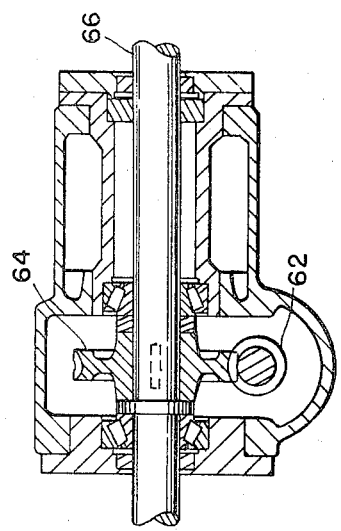
INVENTORS
PETER J. MANETTA
RALPH L. TABOR
WALTER GREENWOOD
BY *Whittemore*
*Hulbert & Belknap*
ATTORNEY

United States Patent Office 3,406,836
Patented Oct. 22, 1968

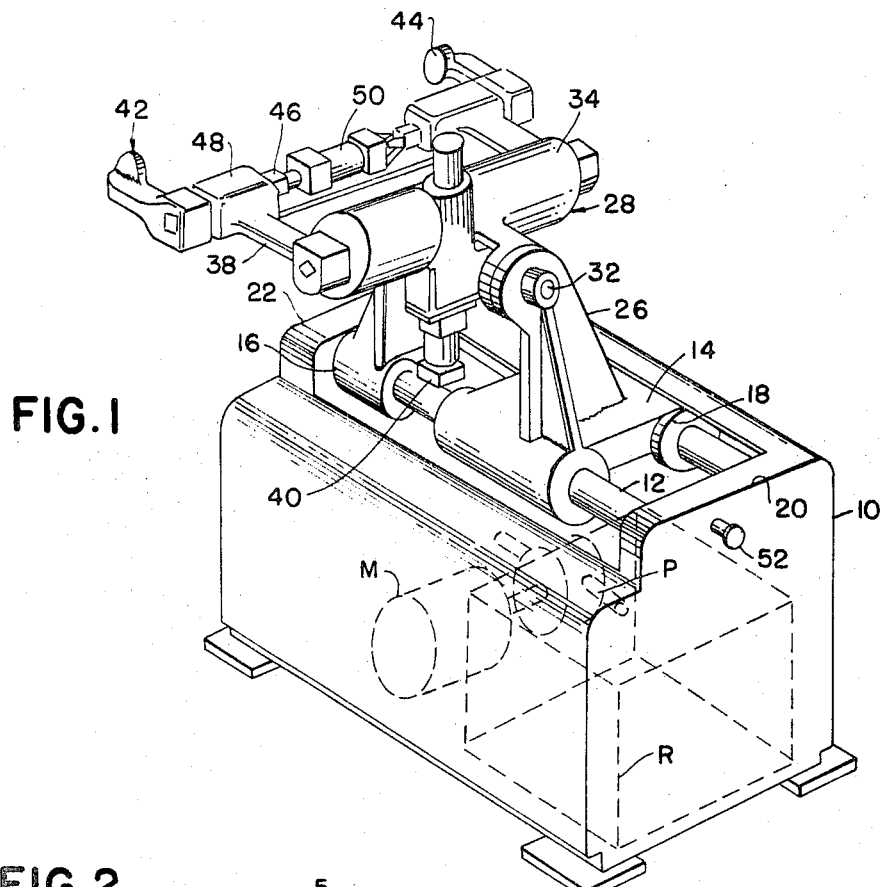
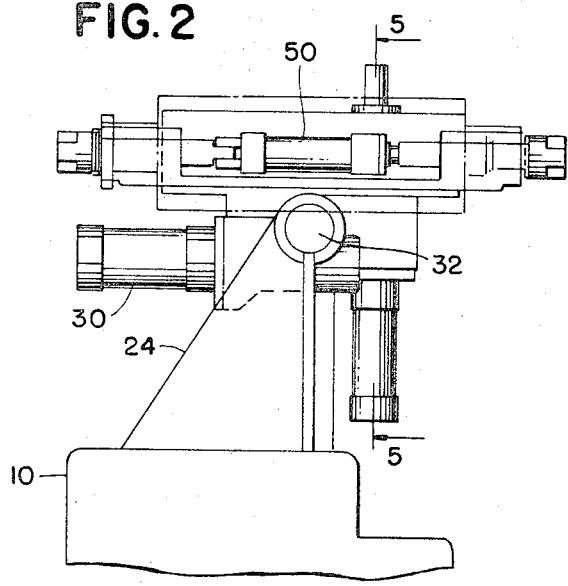

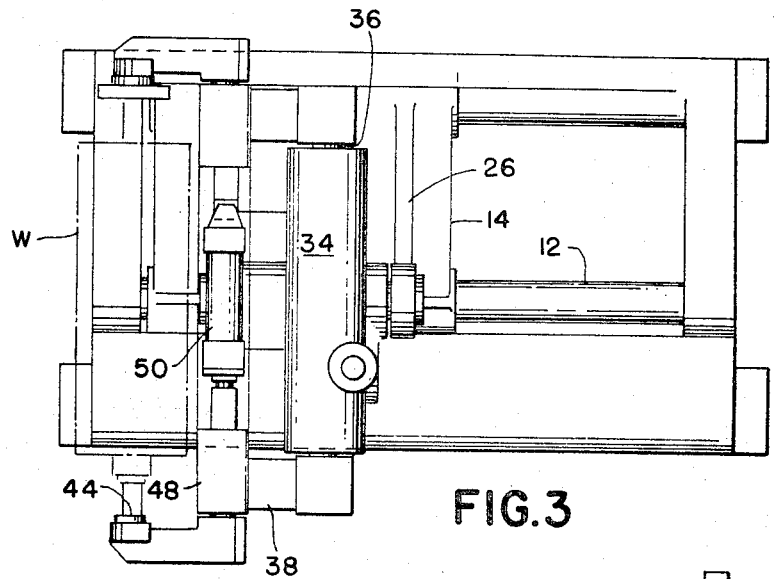
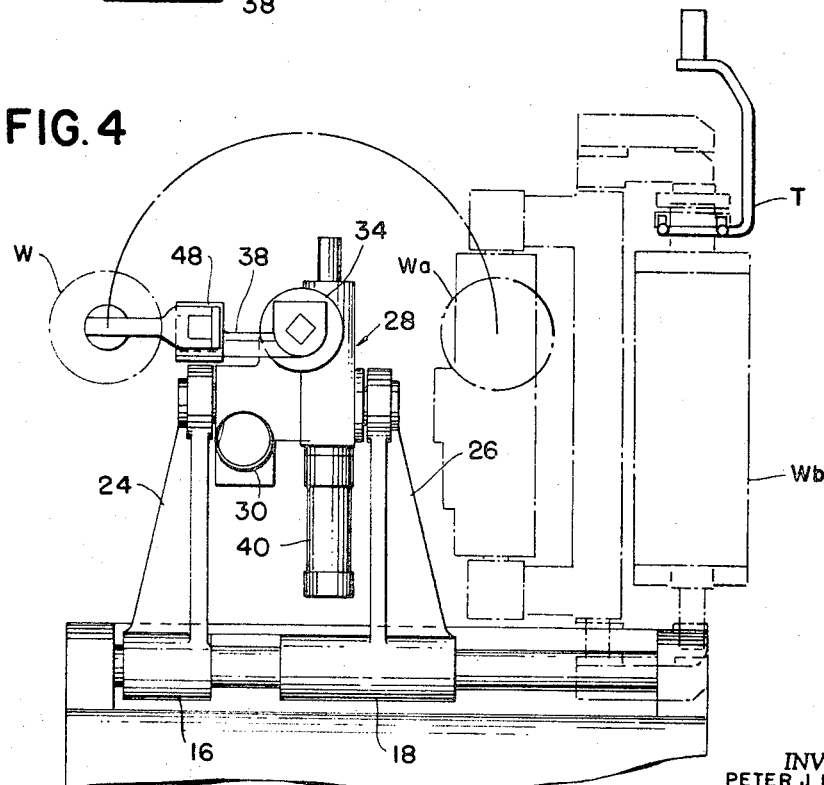

3,406,836
TRANSFER DEVICE
Peter J. Manetta, Warren, Ralph L. Tabor, Birmingham, and Walter Greenwood, Dearborn, Mich., assignors to Simplex Corporation, Detroit, Mich., a corporation of Michigan
Filed Sept. 9, 1966, Ser. No. 578,354
4 Claims. (Cl. 214—1)

ABSTRACT OF THE DISCLOSURE

A transfer unit comprising a base, a slide movable horizontally on the base, a frame pivoted to the slide for rocking movement about an axis parallel to the direction of movement of the slide, pivot mounting means on the frame providing a pivot axis extending perpendicular to the rocking axis of said frame, and work supporting means extending laterally from said frame for rocking movement through an arc of substantially 180 degrees between limiting positions at opposite sides of the frame. A work support gripped by the work supporting means is thus movable over the frame from one end thereof to the other and is movable with the frame from substantially one end of the base to the other, and is in addition rotatable about an axis extending parallel to the direction of movement of the slide.

---

It is an object of the present invention to provide a transfer device effective to rotate the work piece about a first axis through 180 degrees arc to position it at the opposite side of support structure and to rotate it about a second axis perpendicular to the first axis through an arc of 90 degrees so as to re-orient the work piece for acceptance by further mechanism.

It is a further object of the present invention to provide a transfer device as described in the foregoing in combination with further means for effecting rectilinear reciprocation of the work piece supporting structure.

It is a further object of the present invention to provide a transfer device as described in the foregoing in which rotation of work engaging structure is accomplished by means of a rotary motor and worm and worm gear transmission.

It is a further object of the present invention to provide structure as defined in the foregoing in which the rotary motor is a hydraulic motor.

It is a further object of the present invention to provide structure as described in the foregoing comprising a hollow base or support structure containing an electric motor, a reservoir, and a pump for supplying hydraulic fluid under pressure to the hydraulic motors employed in effecting movement of the parts.

Other objects and features of the invention will become apparent as the description proceeds, especially when taken in conjunction with the accompanying drawings, illustrating a preferred embodiment of the invention, wherein:

FIGURE 1 is a perspective view of the transfer device.
FIGURE 2 is a fragmentary end elevation of the device shown in FIGURE 1.
FIGURE 3 is a plan view of the device shown in FIGURE 2.
FIGURE 4 is a front elevational view of the structure shown in FIGURE 3.
FIGURE 5 is an enlarged sectional view on the line 5—5, FIGURE 2.
FIGURE 6 is a sectional view on the line 6—6, FIGURE 5.
FIGURE 7 is a fragmentary sectional view on the line 7—7, FIGURE 6.

Referring first to FIGURES 1-4, the transfer device comprises a base 10 which is hollow and which at its interior is provided with a reservoir R, a motor M, and a pump P, these elements being shown diagrammatically, for the purpose of supplying hydraulic fluid under pressure to operate hydraulic motors as will later appear.

At the top the base 10 is provided with a pair of elongated cylindrical rails 12 on which is provided a slide 14. The slide has tubular ears 16 and 18 receiving the cylindrical rails and mounting the slide 14 for reciprocation between limiting positions as determined by engagement with end wall portions 20 and 22. Means are provided for effecting movement of the slide 14 and may comprise a hydraulic piston and cylinder (not shown) connected between an appropriate portion of the base 10 and the slide 14.

Mounted on the slide 14 are a pair of upstanding posts 24 and 26 forming a trunnion mount for a frame 28. Mounted on the frame for movement therewith both longitudinally of the rails 12 and during rotational movement of the frame is a rotary hydraulic motor 30 connected through suitable gearing later to be described and operable when energized to effect pivotal movement of the frame 28 about a pivot axis 32 extending in parallelism with the rails 12.

The frame 28 includes an elongated sleeve portion 34 in which is rotatably mounted a shaft 36 rigidly connected adjacent its ends to a pair of laterally extending arms 38. Carried by the frame 28 for movement therewith is a second hydraulic motor 40 having gearing, later to be described, effective when the motor is energized to swing the shaft 36 and the arms 38 about the axis of the shaft through an arc 180 degrees.

At the outer ends of the arms 38 is work gripping mechanism indicated generally at 42 herein illustrated as a pair of clamping elements 44 each of which includes an elongated slidable support portion 46 mounted in slideways provided in the interior of blocks 48 at the outer ends of the arms 38. The support portions 46 are interconnected by an equalizing piston and cylinder device 50 effective to move the elements 44 toward and away from each other so as to grip the ends or appropriate portions of a work piece therebetween.

In operation, with the parts in the position shown in FIGURE 1 and assuming an elongated work piece to be in position between the clamping elements 44, pressure is admitted to the piston and cylinder device indicated at 50 in a direction to urge the clamping elements 44 towards each other so as to engage appropriate surfaces on the work pieces. Thereafter, the transfer device is actuated to shift the work piece to a position in which it may be engaged by a machine tool, a conveyor, or the like. The motion imparted to the work piece may be the result of simultaneous actuation of the hydraulic motors 30 and 40 together with the piston and cylinder device which effects movement of the slide 14 longitudinally of the rails 12. Alternatively of course, the several motors may be operated independently in any desired sequence.

It will of course be understood that suitable flexible conduits are provided to interconnect the pump P with the hydraulic motors 30 and 40 and that the flow of hydraulic fluid to these motors is controlled by suitable valves. In general, the rest position of the movable structure will depend upon engagement between adjustable abutments so that a work piece may be moved into exactly predetermined position. For this purpose movement of the slide 14 may be arrested by engagement with an adjustable abutment 52 extending through an end plate of the base 10, a similar adjustable abutment being provided at the opposite end. In like manner, the rotational position of the frame 28 or of the arms 38 may be determined by adjustable abutments built into the pivot supports in any suitable manner and the details of such adjustable abutments are not illustrated herein.

Referring now to FIGURES 5–7 there is illustrated the actual operating mechanism for effecting rotation of the frame 28 and the shaft 36 carrying the arms 38. In FIGURE 5 it will be observed that the rotary hydraulic motor 40 has an output shaft 54 connected to a conical or hourglass worm indicated more or less diagrammatically at 56, which in turn meshes with a worm wheel 58 keyed or otherwise connected to the shaft 36 which at its outer ends carries the arms 38 as best illustrated in FIGURE 1. It will be seen that rotation of the worm 56 will effect rotation of the shaft 36 in whatever position the frame 28 happens to be. In other words, rotation of the shaft 36 relative to the frame 28 may take place simultaneously with movement of the frame 28, both about the trunnion axis 32 as well as longitudinally of the rails 12.

Referring now to FIGURE 6 and 7 it will be observed that the frame 28 has the second hydraulic motor 30 disposed with its axis displaced laterally from and at a right angle with respect to the axis of the motor 40. The output shaft 60 of the motor 30 is connected through suitable couplings to a conical or hourglass worm indicated diagrammatically at 62 which meshes with a worm wheel 64 keyed or otherwise secured to a shaft 66 the ends of which are fixed in the upright trunnion supports or posts 24 and 26. With this arrangement rotation of the worm 62 will cause the entire frame 28 to rotate about the axis of the shaft 66.

Referring again to FIGURES 3 and 4 it will be observed that the transfer device may be employed in a typical operation to pick up an elongated work piece W from a position in which its axis is substantially horizontal and to transfer it by rotation of the arms 38 to the position indicated at W*a* representing basically a horizontal displacement of the work piece. Thereafter, by rotation of the frame 28 about the pivot axis of the trunnion supports 24, 26, the work piece may be rotated into substantially vertical position and may simultaneously or thereafter be shifted horizontally to the position designated W*b*, into engagement with suitable work supporting mechanism herein indicated as supported from a conveyor track or rail T.

The drawings and the foregoing specification constitute a description of the improved transfer device in such full, clear, concise and exact terms as to enable any person skilled in the art to practice the invention, the scope of which is indicated by the appended claims.

What I claim as my invention is:

1. A transfer device comprising an elongated base, longitudinally extending horizontal guide means on said base, a slide movable horizontally on said guide means, a pivot support on said slide providing a horizontal pivot axis parallel to said guide means, a frame pivotally carried by said pivot support, a second pivot support on said frame having a pivot axis perpendicular to the pivot axis of said first pivot support, work support means carried by said second pivot support and including means extending laterally therefrom and swingable upwardly through an arc of 180 degrees to move over said slide to limiting positions at either end thereof, first actuating means connected between said slide and said frame for swinging said frame to move the pivot support thereon between positions in which the axis of said second pivot support extends vertically and horizontally, and second actuating means connected between said frame and said work support means for swinging said work support means 180 degrees from a first position in which said work support means extends horizontally in one direction from said slide to a second position in which said work support means extends in the opposite direction from said slide.

2. A device as defined in claim 1 in which in limiting positions said work engaging means is located adjacent opposite ends of said base.

3. A device as defined in claim 1, said first actuating means comprising means connected between said slide and said frame comprising a first rotary hydraulic motor carried by said frame, a worm connected to said motor, a worm gear fixedly carried by said slide and in mesh with said worm, rotation of said worm causing said worm to move around said worm gear and said frame to move angularly about the axis of said worm gear.

4. A device as defined in claim 3, the second actuating means connected between said frame and said work support means comprising a second rotary hydraulic motor carried by said frame, a second worm driven by said second motor, a shaft rigidly connected to said work support means, and a second worm gear fixed to said shaft and in mesh with said second worm.

References Cited

UNITED STATES PATENTS

| | | | |
|---|---|---|---|
| 2,833,434 | 5/1958 | Stover | 214—1 |
| 3,137,394 | 6/1964 | Trudeau | 214—1 |
| 3,241,687 | 3/1966 | Orloff | 214—1 |

HUGO O. SCHULZ, *Primary Examiner.*

G. F. ABRAHAM, *Assistant Examiner.*